(12) United States Patent
Raber

(10) Patent No.: US 6,886,675 B2
(45) Date of Patent: May 3, 2005

(54) MOTION TRANSMITTING APPARATUS FOR USE IN POWER TRAINS AND THE LIKE

(75) Inventor: Christoph Raber, Ottweiler-Steinbach (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/647,911

(22) Filed: Aug. 25, 2003

(65) Prior Publication Data

US 2004/0074729 A1 Apr. 22, 2004

(30) Foreign Application Priority Data

Aug. 23, 2002 (DE) .......................................... 102 38 791
Oct. 24, 2002 (DE) .......................................... 102 49 461

(51) Int. Cl.[7] .............................................. F16D 27/00
(52) U.S. Cl. ..................... 192/84.6; 192/94; 192/114 R
(58) Field of Search ............................. 192/54.51, 84.6, 192/94, 98, 109 R, 114 R

(56) References Cited

U.S. PATENT DOCUMENTS 3,369,414 A * 2/1968 Helck .......................... 74/89
4,405,041 A * 9/1983 Broadbent ................... 192/98
6,691,850 B2 * 2/2004 Aschoff et al. ............ 192/84.6

FOREIGN PATENT DOCUMENTS

DE    100 33 649 A 1    2/2001

* cited by examiner

*Primary Examiner*—Saul Rodriguez
(74) *Attorney, Agent, or Firm*—Darby & Darby

(57) ABSTRACT

An apparatus which can effect relative movements between first and second parts that are rotatable relative to each other between several positions utilizes a helix having a stack of convolutions and being non-rotatably associated with one of the parts, a follower (such as a pin or an eccentric or an annulus of rolling elements) which is arranged to extend between at least two convolutions of the helix and is affixed to the other part, an electric or fluid-operated or other suitable motor which serves to rotate at least one of the parts relative to the other part, a further part (such as the release bearing for a clutch in the power train of a motor vehicle) which is movable axially with and relative to the first part, and a coupling device serving to separably connect the further part to the first part except in at least one selected position of the second part relative to the first part. Such arrangement facilitates convenient separation of the clutch from the means for operating the release bearing.

12 Claims, 13 Drawing Sheets

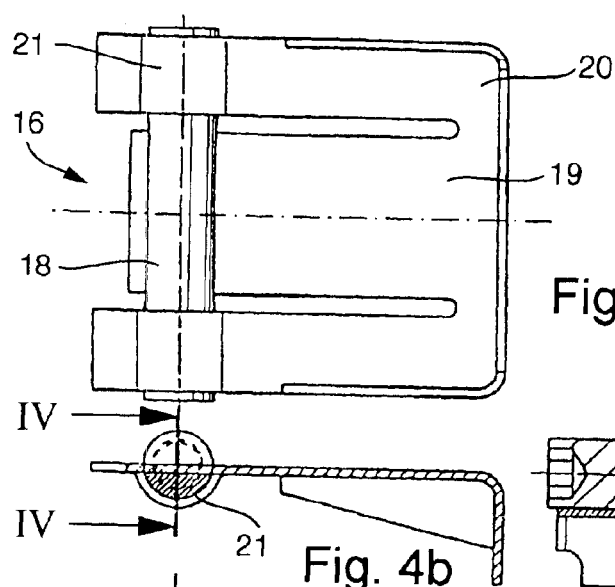
Fig. 4a
Fig. 4b
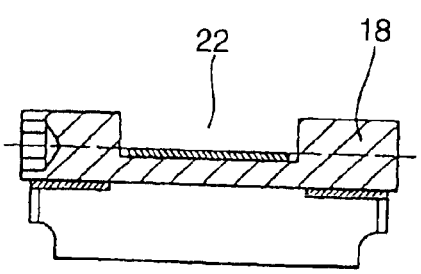
Fig. 4c
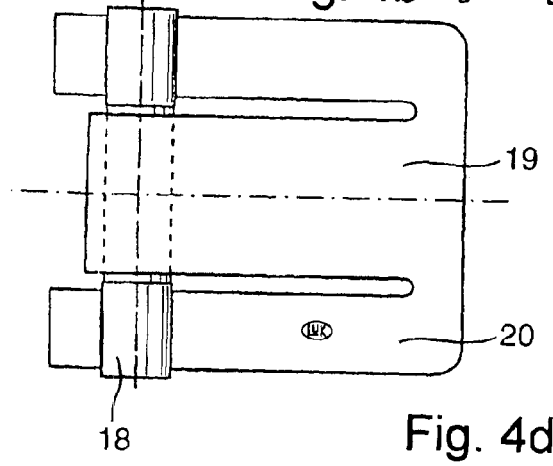
Fig. 4d

MOTION TRANSMITTING APPARATUS FOR USE IN POWER TRAINS AND THE LIKE

BACKGROUND OF THE INVENTION

The present invention relates to improvements in motion transmitting apparatus of the type wherein rotary movements of a first part initiate predetermined movements of a second part and/or of the first part. More particularly, the invention relates to improvements in apparatus wherein an angular movement of one of the parts entails an axial and/or linear movement of another part by way of a motion transmitting assembly wherein the convolutions of a helix which is non-rotatably associated with the first or second part are tracked by at least one follower which is combined with the second or first part.

An apparatus of the above outlined character is disclosed, for example, in published German patent application Serial No. 100 33 649. A drawback of such earlier apparatus is that they cannot be readily mounted in and/or withdrawn from the constituent or constituents (e.g., one or more clutches which are installed in the power train of a motor vehicle to transmit motion from a combustion engine or another prime mover to a change-speed transmission) which is or which are to receive motion therefrom.

Other motion transmitting apparatus of the class to which the present invention pertains are disclosed in my commonly owned copending U.S. patent application Ser. No. 10/040,771 filed Jan. 9, 2002 for "MOTION TRANSMITTING APPARATUS".

Each and every United States and/or foreign patent and/or patent application identified in the specification of the present application is incorporated herein by reference.

OBJECTS OF THE INVENTION

An important object of the present invention is to provide apparatus of the above outlined character which can be readily assembled with and/or disengaged from devices, machines and/or other units wherein the apparatus is or are to initiate controlled movements of one or more constituents.

Another object of this invention is to provide apparatus which can be utilized with advantage to actuate one or more clutches in the power trains of motor vehicles.

A further object of the invention is to provide an apparatus wherein the mobile components of the apparatus can be driven in response to the exertion of a relatively small force.

An additional object of the invention is to provide a novel and improved combination of one or more clutches and actuating apparatus therefor.

Still another object of the invention is to provide a novel and improved method of operating the clutch or clutches in the power train of a motor vehicle.

A further object of this invention is to provide a novel and improved motion transmitting arrangement of the type wherein the convolutions of a helix are tracked by a follower.

Another object of the invention is to provide a novel and improved follower for use in the motion transmitting arrangement.

SUMMARY OF THE INVENTION

One feature of the present invention resides in the provision of an apparatus for effecting a relative movement between first and second parts which are rotatable relative to each other between a plurality of positions. For example, the first part can comprise or constitute a casing, and the second part can comprise or constitute a sleeve. The apparatus comprises a helix (such as a coil spring having a plurality of neighboring convolutions each of which has a circular or non-circular cross-sectional outline) which is non-rotatably associated with the first part, a follower which is affixed to the second part and is arranged to extend between at least two of the neighboring convolutions of the helix, means (such as an electric, fluid-operated or other motor) for rotating at least one of the first and second parts relative to the other part to thus effect a movement of the convolutions and the follower relative to each other, a further part (e.g., a clutch release bearing) which is movable axially with and relative to the first part, and coupling means arranged to separably connect the further part to the first part except in at least one predetermined position of the second part relative to the first part.

An important advantage of the just described embodiment of the present invention is that the further part can be readily separated from and reattached to the first part by the simple expedient of operating the rotating means to move the first and/or the second part in a manner and/or to the extent which is necessary to ensure that the second part reaches or assumes the at least one position in which the further part (such as the aforementioned clutch release bearing) can be readily separated from the first part (e.g., from the aforementioned casing for the helix). Such separability of the third part from the first part is especially desirable and advantageous in the power train of a motor vehicle if the friction clutch is arranged to exert a pull upon the rotating means by way of a prestressing or prestressed spring, and more specifically to exert upon the rotating means a pull within a certain partial range. The region in which the further part is separable from the first part can be selected to coincide with the pressure range of the clutch so that, in normal operation, there is no need to establish a tension-resistant connection between the first and further parts while the further part (release bearing) is subjected to a force which causes it to bear upon the adjacent part of the clutch. Thus, the novel apparatus permits for convenient separation of the further part from the first part and for reattachment of the further part to the first part in conjunction with the pulling and pushing forces which must be transmitted.

The arrangement can be such that, if the second part is movable axially relative to the first part, the coupling means is operative to connect the further part to the first part during a first stage and to permit disconnection of the further part from the first part during a second stage of axial movement of the second part relative to the first part.

As used in the preceding paragraph, the expression "axial movement" is intended to encompass that shifting movement of the rotating means which can be achieved in actual use of a friction clutch and is divisible into the aforementioned first and second stages. Thus, the shifting movement encompasses a range or region in which the further part is connected with the first part in a manner to transmit tensional stresses as well as pushing forces, and a range or region wherein the only forces which can be transmitted between the first and third parts are pushing forces. Thus, it is possible to accurately distinguish between the aforementioned first and second stages of axial movement of the second part relative to the first part of the improved apparatus.

The coupling means can include a springy clamp which is movable at least substantially radially of the second part.

The movement can include a translatory and/or a pivotal movement, and the term clamp is intended to encompass a connector which is movable to and from a position in which it can establish a form-or force-locking connection. It is also possible to employ an at least substantially rigid clamp, i.e., a connector which need not be designed to exhibit a pronounced yieldability. For example, the clamp can be designed to perform pivotal movements on its way from the operative position to the inoperative position or vice versa; such clamp can be produced and/or installed and/or operated in a particularly simple and inexpensive manner.

The further part can be provided with a projection which is engaged by the coupling means when the further part is connected to the first part. It is often preferred to employ a claw-like projection because a further part bearing a claw can be mass produced at a reasonable cost and ensures reliable engagement between the first and further parts. It normally suffices to provide the further part with a projection which has a surface or edge or an analogous configuration capable of taking up axial stresses.

If the coupling means comprises a clamp, the latter can be provided with an offset portion. Furthermore, if the second part of the apparatus is movable axially relative to the first part and if the coupling means comprises a springy clamp which is movable at least substantially radially of the second part, the improved apparatus can further comprise an abutment which is positioned to prevent radial movements of the clamp except in the at least one position of the second part relative to the first part. The abutment is arranged to maintain the clamp in a position in which the further part is connected to the first part save for the at least one position of the second part relative to the first part. The abutment can be disengaged from the clamp in the at least one position of the second part relative to the first part. Furthermore, the abutment can engage and hold at least one pin which extends at least substantially circumferentially of the helix. To this end, the abutment can include tongues which engage and fix the at least one pin relative to the abutment.

The purpose of the pin is to act as an emergency disengaging means for the further part. Thus, and assuming that the further part is the release bearing of a friction clutch in the power train of a motor vehicle, and assuming further that the power train fails while the vehicle is in the process of pulling a load, the release bearing can be disengaged from the first part by the simple expedient of changing the angular position of the pin relative to the abutment. This reduces the stress upon the clamp and the release bearing does not oppose removal of the friction clutch from the power train of the vehicle.

Another feature of the present invention resides in the provision of an apparatus for effecting a relative movement between first and second parts which are rotatable relative to each other between a plurality of different position. The apparatus can include the aforediscussed helix, the aforediscussed means for rotating at least one of the parts relative to the other part to thus effect a movement of the convolutions of the helix relative to a follower and/or vice versa, and a modified follower which includes a plurality of rolling elements arranged to extend between at least two of the neighboring convolutions forming part of the helix.

An important advantage of the just described modified apparatus is that its space requirements are much less than those of apparatus wherein the helix cooperates with other types of followers.

The follower can employ many types of rolling elements, e.g., spherical, cylindrical, conical (tapered), lenticular, barrel-shaped and/or others. It is often preferred to employ spherical rolling elements, for example, balls similar to those utilized in ball bearings. If the follower employs spherical rolling elements, such elements are preferably mounted in the apparatus in such a way that the convolutions of the helix are engaged by other than equatorial portions of the spherical elements. In other words, the helices are engaged by those portions of the balls which have dimensions smaller than the diameters of the respective balls.

The rolling elements of the follower can be installed in the apparatus in such a way that they are compelled to travel along circular, oval or other suitable paths. It is preferred to select for the rolling elements a path which is located within the confines of the helix and which ensures that each rolling element engages the adjacent helices only during movement along a relatively small portion of its path.

The convolutions of the helix can have a circular or non-circular cross-sectional outline, and such convolutions can be disposed radially inwardly or outwardly of the rolling elements of the follower.

The improved apparatus can further comprise at least one prestressing spring which serves to take up torque being applied to the first part by the follower when the follower turns relative to the helix and/or vice versa. Friction which exists between the helix and the follower necessarily results in the generation of torque when the follower moves relative to the adjacent convolutions of the helix and/or vice versa. Such torque can be taken up, in its entirety, by the prestressing spring, i.e., it is not necessary to provide special guide means such as an axially extending tongue-groove combination or the like.

The rotating means of the improved apparatus can include external drive means. This renders it possible to dispense with an electric motor which is installed in the interior of the apparatus and often includes a stator and/or a rotor which, in addition to its function as part of the electric motor, also performs other tasks.

The external drive means can include at least one wheel (e.g., a pulley) and at least one endless flexible element which is trained over the wheel. The endless flexible element can include a cable, a V-belt, a belt having an at least substantially circular cross-sectional outline, a toothed belt, a toothed belt having an at least substantially circular or oval cross-sectional outline, a chain or the like.

It is also possible to utilize a rotating means which employs mating gears. If the second part of the apparatus includes a sleeve, at least one of the gears and a bearing for the second part can be disposed within the sleeve or externally of the sleeve.

If the apparatus employs the aforediscussed prestressing spring, at least one of the gears and the just mentioned bearing are or can be aligned with such spring.

The means for rotating can include mating gears which together constitute a multistage gearing. Such undertaking can be resorted to in order to increase the achievable transmission ratio.

If the means for rotating includes mating gears, such gears can include at least one internal gear and a second gear mating with the internal gear. This contributes to a substantial reduction of space requirements of the rotating means.

It is also possible to employ a rotating means which comprises at least one fluid-operated (such as a pneumatic) motor. Such motor can constitute a reciprocating-or rotary-piston motor or a turbo machine.

The rotating means is preferably of the self-locking type. For example, if the rotating means includes a self-locking pneumatic motor, one can dispense with separate blocking means for such motor. However, it is equally within the purview of the present invention to provide the improved apparatus with discrete means for blocking the motor, e.g., with a mechanical blocking device, or with a device for blocking the supply of compressed air or another gaseous fluid to a rotary piston motor.

It is also possible to employ a pneumatic motor which is directly coupled to the aforementioned gearing, to the aforementioned cable-and-wheel drive, to a bowden drive or to any other suitable drive such as one employing one or more V-belts, belts having curcular cross-sectional outlines, toothed belts, toothed belts having circular cross-sectional outlines, chains or the like. For example, a pneumatic motor can be directly coupled to a toothed gear, to an endless belt, to the input shaft for a gearing and/or to other driven motion transmitting means.

A further feature of the present invention resides in the provision of an apparatus which comprises the aforementioned first and second parts, the aforementioned helix, the aforementioned rotating means, and an eccentric rotary folower which is associated with the second part and is arranged to extend between at least two neighboring convolutions of the helix.

The eccentric rotary follower can constitute a disc having a circular peripheral surface, and such disc can be arranged to rotate about an axis of rotation which is spaced apart from a central point of the follower. The symmetry axis of such follower can be inclined relative to its axis of rotation and the two axes can cross each other in space.

In accordance with one presently preferred embodiment, the follower comprises an inner disc, an annular outer disc which spacedly surrounds the inner disc, and an antifriction ball, roller or other suitable bearing between the two discs. The width of the annular outer disc (as measured in its radial direction) is or can be at least substantially constant.

The apparatus which employs the normally disc-shaped eccentric follower can further include a clutch release bearing (such as the aforediscussed further part) and means for releasably coupling the release bearing to one of the first and second parts.

If the eccentric rotary follower is constructed and designed in the aforementioned manner, namely that its axis of rotation is spaced apart from its central point, the thus achieved eccentricity and the roundness of the peripheral surface of its outer disc ensure that, when the inner disc is rotated by a motor or the like (such as by way of the aforediscussed second part of the apparatus), the eccentric follower performs an eccentric movement.

If the axis of symmetry is inclined (e.g., through a relatively small acute angle) relative to the axis of rotation of the eccentric follower, the latter performs an eccentric movement as well as a wobbling movement, namely a periodic back-and-forth movement in the direction of the axis of rotation. The eccentric follower can act as a swash plate if its axis of symmetry is inclined relative to the axis of rotation of the drive means, i.e., if it is mounted askew. This term is intended to designate an arrangement wherein two non-parallel straight lines do not intersect each other, i.e., wherein the two straight lines cross each other in space.

An advantage of the antifriction bearing between the inner and outer discs of that presently preferred embodiment of the follower wherein the outer disc is a ring which is or can be coplanar with the inner disc is that the outer disc encounters little (practically no) resistance to its rotation as a result of contact with the neighboring convolutions of the helix.

If there is need to simultaneously or selectively operate or actuate two or more discrete clutches in the power train of a motor vehicle or other multiple arrangements which must be actuated simultaneously or selectively, the invention provides a plurality of (such as two) apparatus each of which is arranged to effect a relative movement between first and second parts which are rotatable relative to each other between a plurality of positions.

In a first embodiment of such arrangement, each apparatus can comprise a helix which is non-rotatably associated with the first part of the respective apparatus, a follower which is affixed to the second part of the respective apparatus and is arranged to extend between at least two convolutions of the helix, means for rotating at least one of the first and second parts relative to the other part of the respective apparatus to thus effect a movement of the convolutions and the follower relative to each other, a further part which is movable axially with and relative to the first part of the respective apparatus, and coupling means serving to connect the further part to the first part except in at least one position of the second part relative to the first part of the respective apparatus.

It has been ascertained that the space requirements of such plural apparatus are much less than those of several conventional clutch actuating apparatus or the like. Furthermore, the plural apparatus can be assembled and/or dismantled within surprisingly short periods of time because the first and third parts of each apparatus can be coupled to or uncoupled from each other with little loss in time. Thus, there is no need for bolts and nuts, screws, rivets and/or analogous parts which can be misplaced and which must be manipulated by automatic and/or other types of tools or the like.

Two discrete clutches can form part of a twin clutch.

Each of plural apparatus in the improved arrangement can further comprise a first arrangement or array of rolling elements with a first bearing sleeve and a second arrangement or array of rolling elements with a second bearing sleeve which is preferably coaxial with and surrounds the first bearing sleeve. At least one of the bearing sleeves can include a gear. At least one second gear can be provided to mate with the gear of the at least one bearing sleeve and the two gears can be coaxial with each other. Coaxial shafts can be provided to carry the coaxial gears. In the absence of such shafts, the gears of each pair must be angularly offset relative to each other.

One of the coaxial shafts is or can be received in the (hollow) other shaft.

The further part of each of the apparatus in the just described arrangement of plural apparatus can constitute a release bearing if each of the apparatus cooperates with a discrete clutch.

An additional feature of the invention resides in the provision of a combination of a clutch with an apparatus of the above outlined character, in the provision of several clutches each of which cooperates with an apparatus of the above outlined character, and in the provision of one or more machine parts each of which embodies an apparatus of the above outlined character.

The novel features which are considered as characteristic of the invention are set forth in particular in the appended clams. The improved apparatus itself, however, both as to its construction and the modes of assembling, installing and operating the same, together with additional important features and attributes thereof, will be best understood upon perusal of the following detailed description of certain presently preferred specific embodiments with reference to the accompanying drawing.

BRIEF DESCRIPTION OF THE DRAWING

FIG. 4a is a bottom plan view of an abutment which is or which can be utilized in the apparatus of FIGS. 1 to 3;

FIG. 4b is a sectional view as seen in the direction of arrows from the line IVb—IVb in FIG. 4a;

FIG. 4c is a sectional view as seen in the direction of arrows from the line IVc—IVc in FIG. 4b;

FIG. 4d is a top plan view of the abutment of FIGS. 4a to 4c;

DESCRIPTION OF PREFERRED EMBODIMENTS

Figure 1:
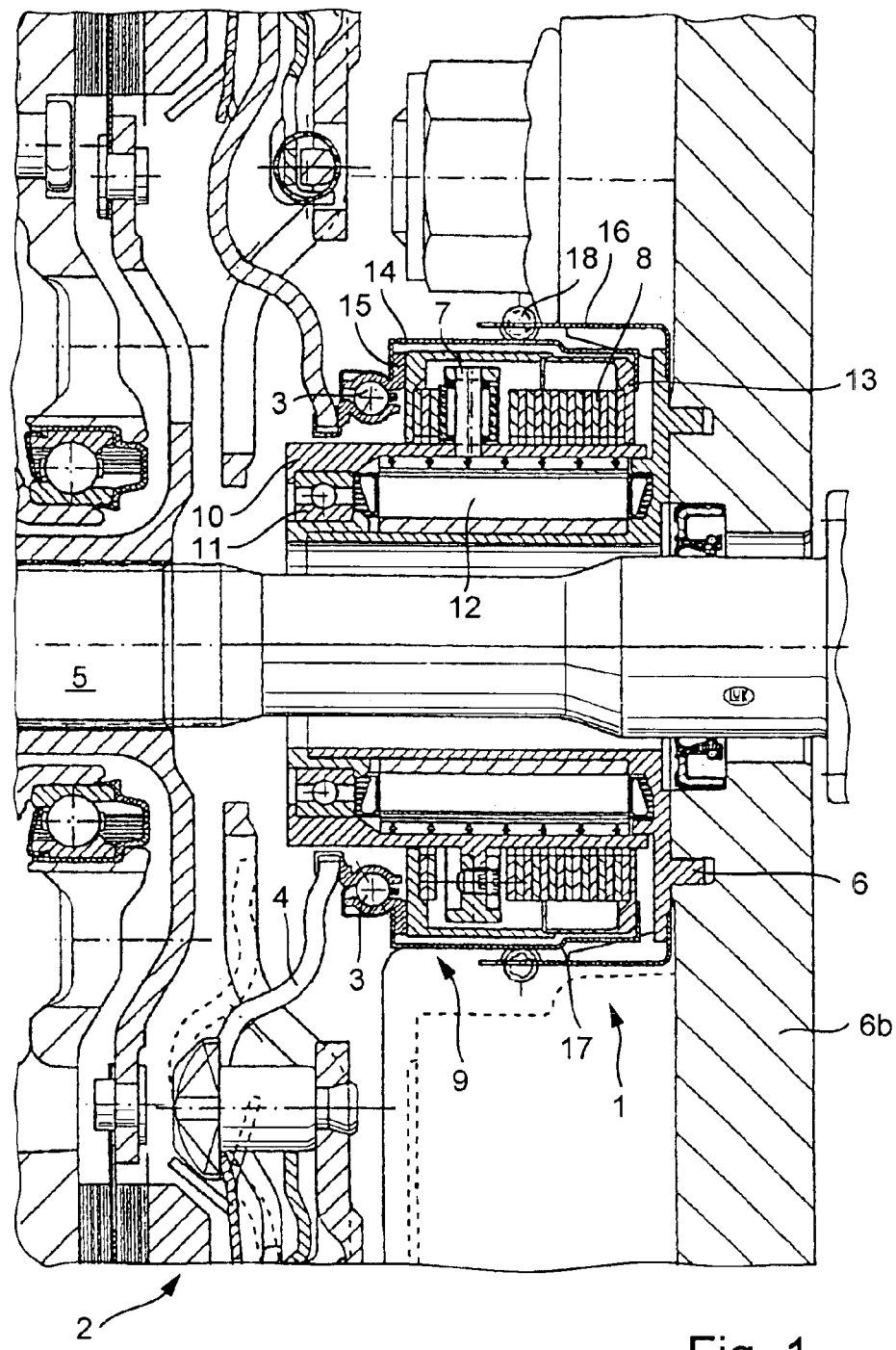
FIG. 1 is a fragmentary axial sectional view of an apparatus which embodies one form of the present invention and is shown in a rear end position in which it cooperates with the release bearing of a friction clutch in the power train of a motor vehicle, the apparatus being coupled to the case of a transmission in the power train of the motor vehicle.

FIG. 1 illustrates an apparatus which constitutes an axial drive and serves to operate or actuate a clutch 2, e.g., a friction clutch in the power train of a motor vehicle. The clutch 2 comprises a customary diaphragm spring 4 which can be tilted by a release bearing 3 in a manner well known from the art of clutches for use in the power trains of motor vehicles. Reference may be had, for example, to col. 11, line 17 of commonly owned U.S. Pat. No. 5,069,321 granted Dec. 3, 1991 to Reik et al. for "TORQUE TRANSMITTING AND TORSION DAMPING APPARATUS FOR USE IN MOTOR VEHICLES".

The apparatus 1 surrounds a shaft 5 and is nonrotatably confined in a stationary part 6 which is installed in a housing 6b, e.g., the case or housing of a change-speed transmission which is to receive torque from the prime mover (such as an internal combustion engine) of the motor vehicle by way of the clutch 2. A follower 7 of the apparatus 1 is rotatable relative to the shaft 5 and is arranged to track the convolutions of a helix (coil spring) 8 and to thus move axially of the shaft. The follower 7 can move toward the one or the other end convolution of the helix 8, depending upon the direction of its orbital movement about the shaft 5. By the same token, the helix 8 can move axially of the shaft 5 toward or away from the clutch 2 if the helix is installed to move axially in response to rotation of the follower 7 and the latter is arranged to remain in a fixed axial position relative to the shaft 5. The helix 8 and the follower 7 can be said to jointly constitute a spring-spindle arrangement 9.

The follower 7 is mounted on a sleeve-like carrier 10 which is rotatable relative to the stationary part 6 with the interposition of an antifriction bearing 11, e.g., a ball bearing or a roller bearing. In the embodiment of FIG. 1, the carrier 10 and the follower 7 are rotatable about the axis of the shaft 5 by a prime mover (rotating means) including or constituting an electric motor having a stator 12 and a rotor, not shown in FIG. 1. The helix 8 is confined in a casing 13 which causes the helix to form a package of coaxial convolutions, with the follower 7 extending between two such convolutions. The casing 13 is shiftable axially of the sleeve 10. A coupling means here shown as a springy clamp 14 is provided to engage a projection 15 of the release bearing 3 for the clutch 2. An abutment 16 serves to fix the clamp 14 in the position which is shown in FIG. 1.

When the parts of the apparatus 1 assume the positions shown in FIG. 1, the helix 8 dwells in its rear end position. At such time, the helix 8, and hence the release bearing 3, are maintained at a minimum distance from the transmission case 6b, and the release bearing then normally holds the clutch 2 in the engaged condition in which the clutch transmits or can transmit torque from the engine to the transmission or vice versa.

Figure 2:
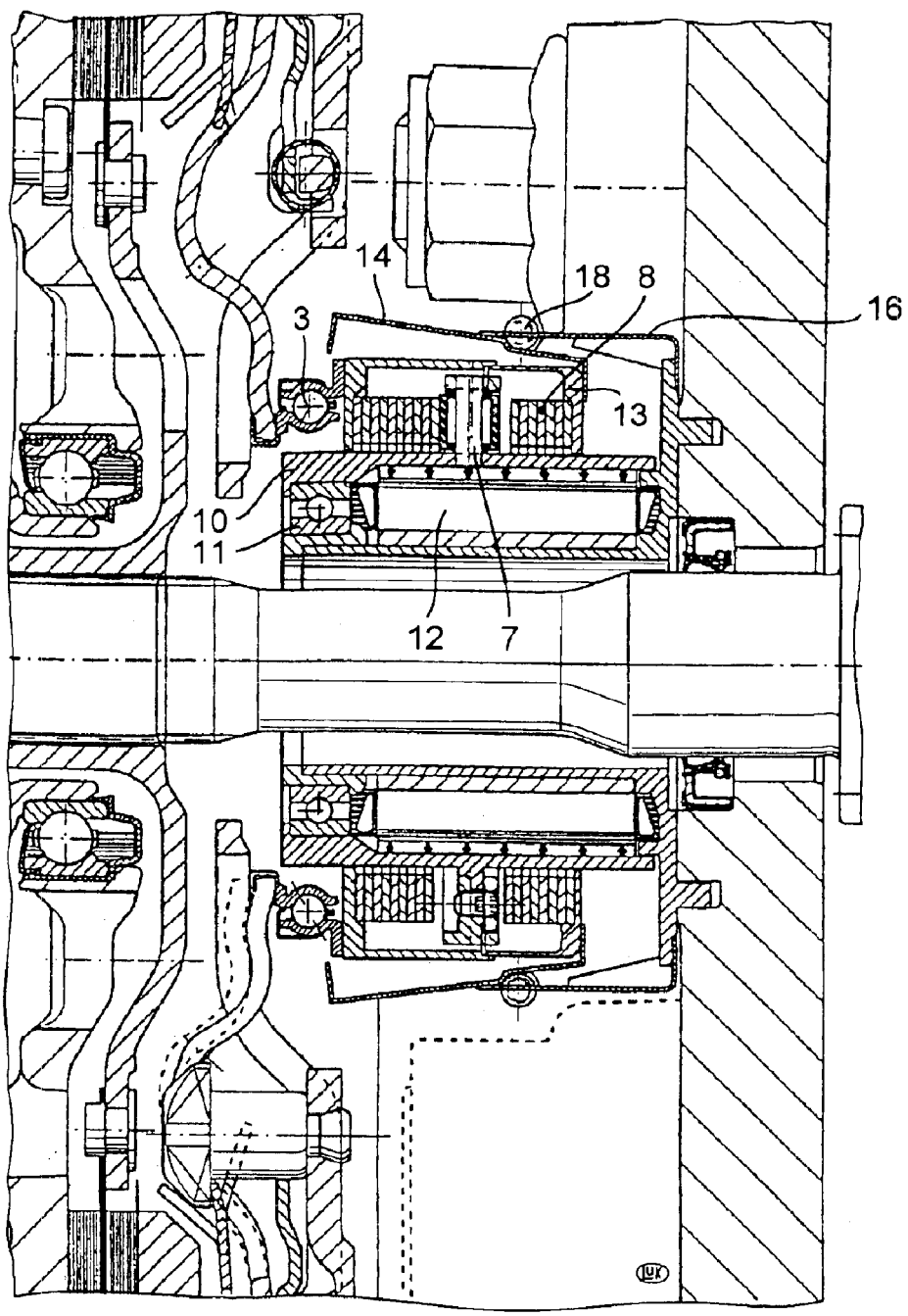
FIG. 2 shows the structure of FIG. 1 but with the apparatus in another end position.

FIG. 2 shows the parts 3, 8 and 13 of the apparatus 1 in their other (front) end positions. These parts normally assume such end positions when the friction clutch 2 is disengaged. The springy clamp 14 is not in engagement with the projection 15 of the bearing 3. Therefore, and as shown in FIG. 3, the clutch 2 and the release bearing 3 can be shifted axially of the shaft 5 and away from the apparatus (axial drive) 1.

The resilient clamp 14 is installed in prestressed condition and is provided with several offset portions or extensions 17 which are spaced apart from the clutch 2, as seen in the axial direction of the shaft 5. Furthermore, the abutment 16 carries at least one pin 18 which is engaged by the adjacent portion of the clamp 14 when the apparatus 1 assumes the axial position of FIG. 1; a projection of the clamp 14 then reliably engages the projection 15 of the release bearing 3. When the apparatus 1 assumes the axial position of FIG. 2, the pin 18 does not maintain the projection 15 of the clamp 14 in engagement with the projection 15 of the release bearing 3 so that the clamp 14 (which tends to move its projection radially outwardly) no longer holds the apparatus 1 in the axial position of FIG. 1. Thus, the release bearing 3 and the clutch 2 can move axially of the shaft 5 and away from the apparatus 1 and/or vice versa.

Figure 3:
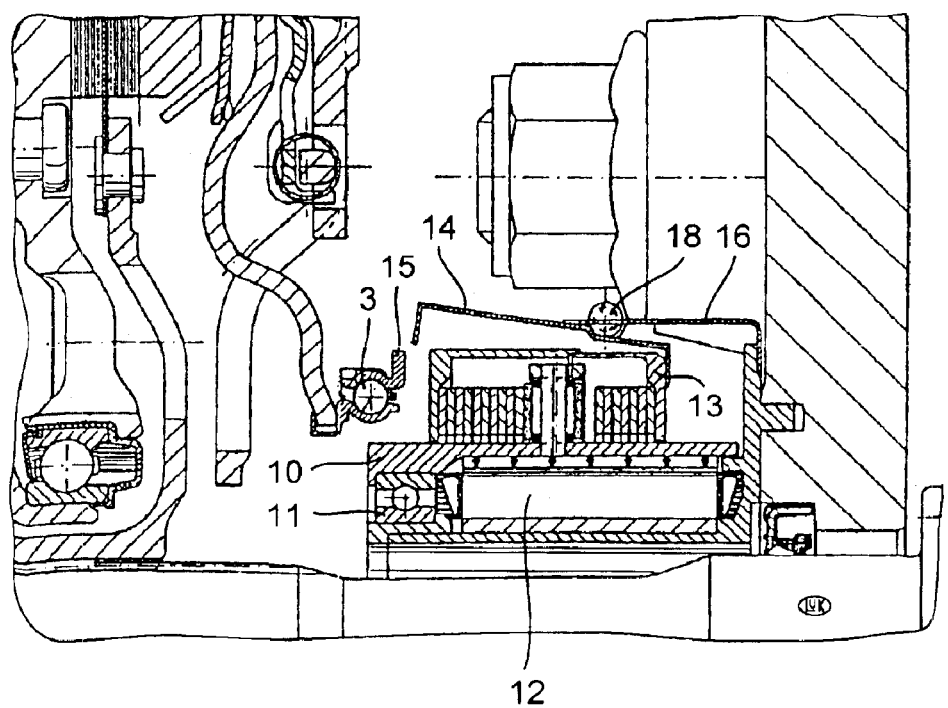
FIG. 3 shows a portion of the structure of FIG. 2 but with te release bearing pulled away from a resilient clamp of the apparatus.

The clamp 14 need not exhibit a tendency to move from the position of FIG. 1 to that which is shown in FIGS. 2 and 3. Instead, the apparatus 1 can comprise one or more discrete springs or other suitable biasing means (not shown) which tends or tend to move the clamp 14 from the position of FIG. 1 to that which is shown in FIGS. 2 and 3. Furthermore, the arrangement can be such that the clamp 14 comprises two or more sections which tend to move radially outwardly (when permitted by the pin 18 or the like) from the position of FIG. 1 to that corresponding (analogous) to or identical with the position of FIGS. 2 and 3, i.e., the clamp 14 can be installed to perform translatory and/or pivotal or other movements which enable its projection or projections to engage with or to become disengaged from the projection(s) 15 of the release bearing 3.

The clamp 14 holds the parts 1 and 2 against axial movement relative to each other when it assumes the position of FIG. 1, i.e., when the apparatus dwells in the axial position of FIG. 1; at such time, the clamp (coupling means) 14 is being acted upon by the pin 18 on the abutment 16. This holding action of the clamp 14 is terminated or interrupted when the apparatus 1 assumes the axial position of FIG. 2 or 3 because the clamp 14 is then free (e.g., due to its tendency to dissipate energy and/or due to the provision of one or more springs) to move its projection away from engagement with the projection 15 of the release bearing 3. Consequently, the apparatus 1 can pull the release bearing 3 and the radially inwardly extending prongs of the diaphragm spring 4 in a direction to the left (e.g., to engage the clutch 2 or to enhance the extent of engagement of the clutch, i.e., to reduce the extent of slip between the output shaft of the engine and the input shaft of the transmission in the case 6) only when the projection(s) of the clamp engages or engage the projection(s) 15 of the release bearing 3. The clutch 2 need not be form-lockingly connected with the apparatus 1 because, if the clutch is to be actuated, the release bearing 3 is simply pushed against the radially innermost portions of the aforementioned prongs of the diaphragm spring 4 in order to maintain the clutch 2 in an at least partially engaged condition. At such time, the clutch 2 can be readily separated from the apparatus 1 because the parts 3 and 4 need not be positively connected to each other. The release bearing 3 is borne or can be carried by the tips of prongs forming part of the diaphragm spring 4. Separation of the parts 1 and 2 from each other can take place for the purposes of inspection, cleaning, repair or replacement.

The aforementioned components 13, 10 and 3 can be said to respectively constitute the first, second and further parts or components or constituents of the improved apparatus 1.

FIGS. 4a to 4d illustrate one presently preferred embodiment of an abutment 16 and a pin 18 which can be utilized in the apparatus 1 of FIGS. 1 to 3. FIG. 4a is a bottom plan view, FIG. 4b is a sectional view as seen in the direction of arrows from the line IVb—IVb of FIG. 4a, FIG. 4c is a sectional view as seen in the direction of arrows from the line IVc—IVc in FIG. 4b, and FIG. 4d is a top plan view of the parts 16 and 18. The abutment 16 is or can be made of a strip of metal and is formed with two elongated slits dividing the strip into an inner or central tongue 19 and two outer tongues 20 which flank the tongue 19 and extend transversely of the pin 18. The outer tongues 20 are provided with substantially semicylindrical sockets 21 for portions of the pin 18. FIG. 4c shows that the central portion of the pin 18 is provided with an elongated cutout or recess 22 for a portion of the inner tongue 19 so that the latter maintains portions of the pin 18 in the sockets 21. The abutment 16 is further provided with a lug 23 which secures it to the stationary part 6 (not shown in FIGS. 4a to 4d).

Figure 5:
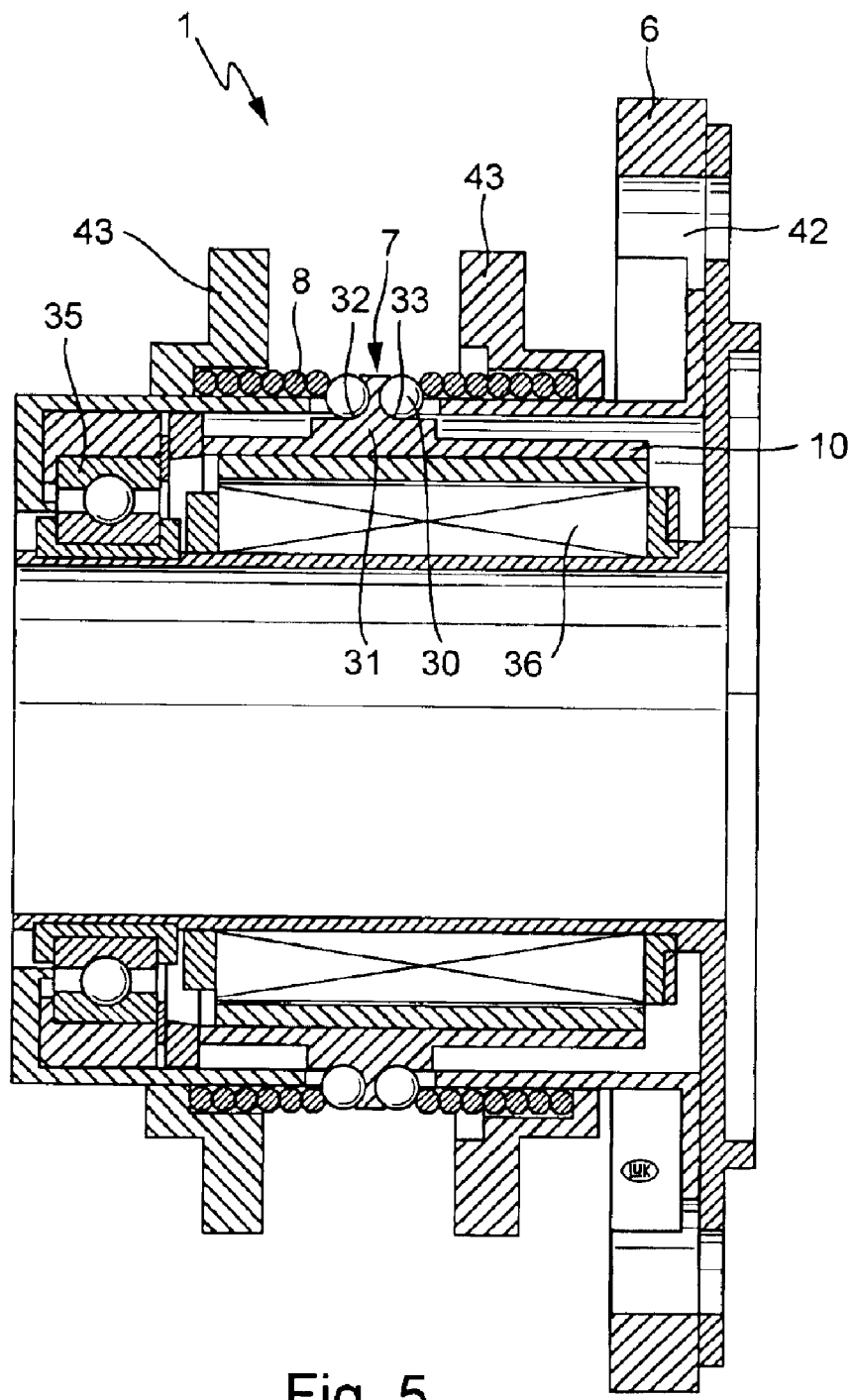
FIG. 5 is a partly sectional perspective view of a modified apparatus wherein the follower comprises two annular arrays of spherical rolling elements within the helix.

FIG. 5 shows a further embodiment of the improved apparatus 1 with orbiting rolling elements 30 which act as a follower, i.e., which replace the follower 7 of FIGS. 1 to 3. The rolling elements 30 are disposed radially inwardly of the helix (coil spring) 8 and can act as a means for pushing or pulling the sleeve 10; they are installed in a cage 31 which enables them to roll along an eccentric path so that succesive rolling elements 30 come into a mere point contact with the convolutions of the helix 8. Such path comprises two sections or stretches including a circular first section 32 which permits the rolling elements 30 to contact the helix 8. The second section 33 of the path is also circular but is laid out to disengage the rolling elements 30 from the helix 8. The rolling elements 30 in the path section 33 engage the helix 8 when the latter is to be pushed, and the rolling elements 30 in the path section 32 serve to pull the helix. If the apparatus 1 of FIG. 5 is to serve only as a means for pulling or only as a means for pushing, one of the path sections 32, 33 can be dispensed with because the axial force which is required to disengage the clutch (not shown in FIG. 5) develops in a single direction and the force of the disengaged clutch ensures the establishment and maintenance of contact between the rolling elements 30 and the helix 8.

It will be seen that the apparatus 1 of FIG. 5 can be put to use in conjunction with push-type and/or pull-type clutches which can be forcibly engaged or disengaged.

The cage 31 for the rolling elements 30 is installed in the sleeve 10. The parts 30 and 31 are an equivalent of the follower 7 in the apparatus 1 of FIGS. 1 to 3. The sleeve 10 is rotatably mounted in an antifriction bearing 35 and simultaneously acts as the rotor of an electric motor for the sleeve 10. The stator winding 36 of the electric motor is installed within the confines of the apparatus 1.

The rolling elements 30 of the apparatus 1 which is shown in FIG. 5 are spheres. However, it is equally within the purview of the present invention to employ otherwise configurated (e.g., barrel-shaped) rolling elements. The illustrated spherical rolling elements 30 are arranged and dimensioned in such a way that only certain portions of the diameters of their circumferences contact the helix 8. The path for the spherical rolling elements 30 has a uniform diameter save for a stretch of about 65° wherein the diameter is smaller. Thus, each path or track carries along a circumferential stretch of 360°. Otherwise stated, the spherical rolling elements 30 engage the helix 8 outside of their equatorial circumference.

That path for the spherical rolling elements 30 which is provided by the cage 31 is substantially oval so that the rolling elements engage the helix 8 at a certain point of such path. However, it is equally possible to replace the oval path with a substantially circular eccentric path. The helix 8 which is utilized in the embodiment of FIG. 5 has convolutions with a circular cross-sectional outline. However, it is also possible to employ a coil spring with convolutions having an oval or polygonal (such as square) cross-sectional outline. An advantage of the illustrated helix 8 is that it is less expensive than a spring consisting of convolutions having a non-circular cross-sectional outline; in fact, the illustrated helix (coil spring) 8 can be drawn from available standard supplies in the magazine of a maker of coil springs.

The casing 13 in the apparatus 1 of FIG. 5 is secured against rotation relative to the stationary part 6, e.g., by resorting to a standard tongue-and-groove joint. The stationary part 6 is provided with a circumferentially extending collar 41 having bores or holes 42 for fasteners which secure the apparatus 1 of FIG. 5 to a stationary part, e.g., to the transmission case 6b.

The reference character 43 denotes in FIG. 5 one of an annular array of abutments which can cooperate with a release bearing, such as the release bearing 3 of FIG. 1, to actuate a friction clutch in the power train of a motor vehicle. The release bearing can be secured to the casing 13 or to the diaphragm spring (4) of the friction clutch (2). In the embodiment of FIG. 5, the helix 8 is located outwardly of the rolling elements 30 (as seen radially of the helix).

Figure 6:
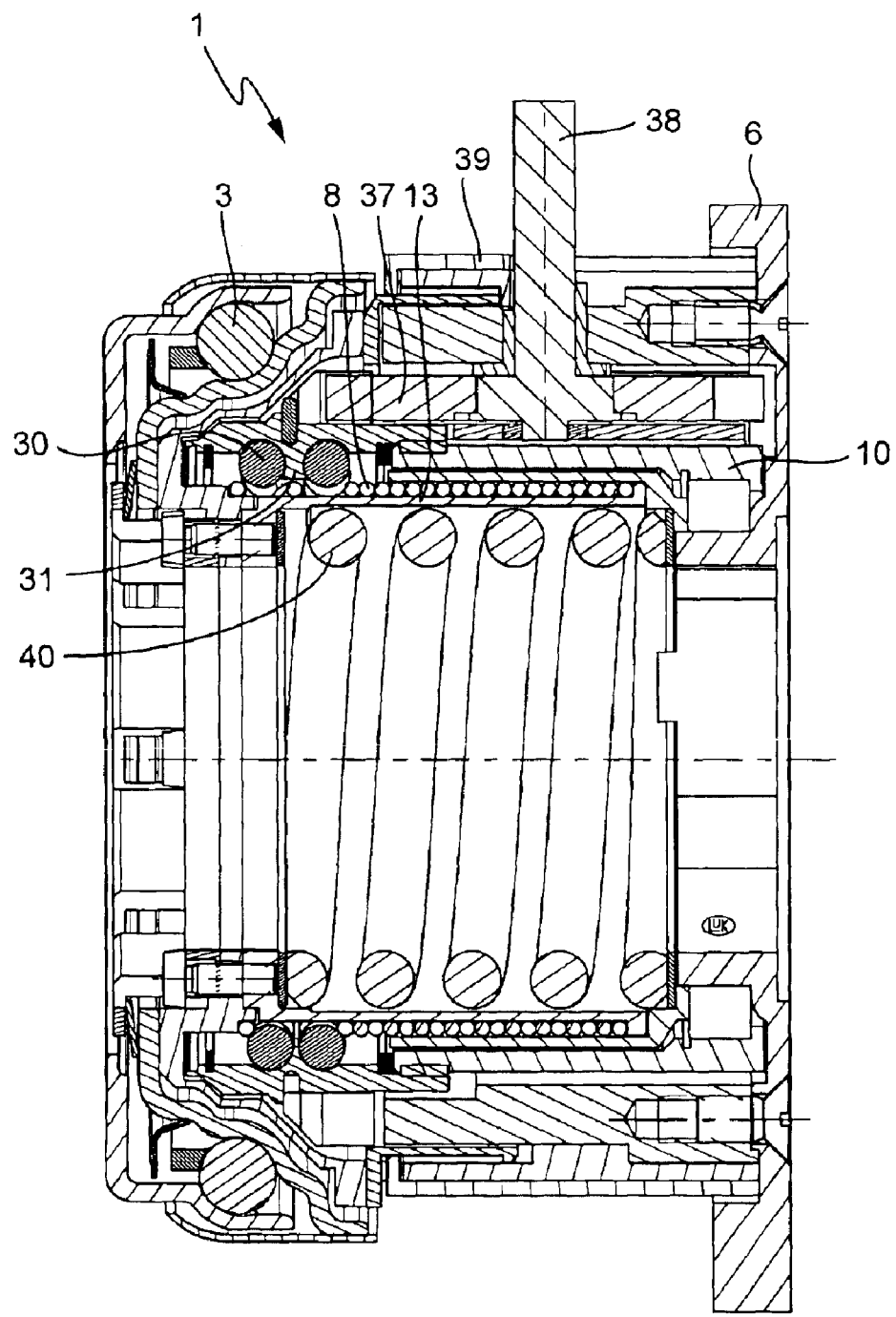
FIG. 6 is a similar partly sectional perspective view of an apparatus wherein the rolling elements of the follower are disposed radially outwardly of the helix.

FIG. 6 shows a modification of the apparatus which is illustrated in FIG. 5. Instead of employing an electric motor with a stator and a rotor within the apparatus, the embodiment of FIG. 6 employs an external drive, e.g., a hydraulic or pneumatic drive, an electric motor, a bowden cable or the like. All such parts of the apparatus shown in FIG. 6 which are identical with or plainly analogous to those in the previously described embodiments of the improved apparatus are denoted by similar reference characters.

The apparatus 1 of FIG. 6 comprises a stationary part 6 having a collar or flange which is or which can be affixed to a stationary carrier (e.g., to the case 6b of a change-speed transmission). The helix 8 is confined in a casing 13 and serves to permit axial adjustments of the clutch release bearing 3. The means for moving the helix 8 axially comprises a follower including rolling elements 30 which are confined in a cage 31, e.g., in a manner as already described with reference to FIG. 5. A difference between the embodiments of FIGS. 5 and 6 is that, in FIG. 6, the rolling elements 30 of the follower are disposed radially outwardly of the helix 8. Thus, the path for the rolling elements 30 surrounds the helix. The cage 31 for the rolling elements 30 is connected with a driving sleeve 37 which is engaged by a driving pin 38 or the like. A protective shield 39 serves to seal the apparatus 1 of FIG. 6 from the surrounding atmosphere.

Figure 7:
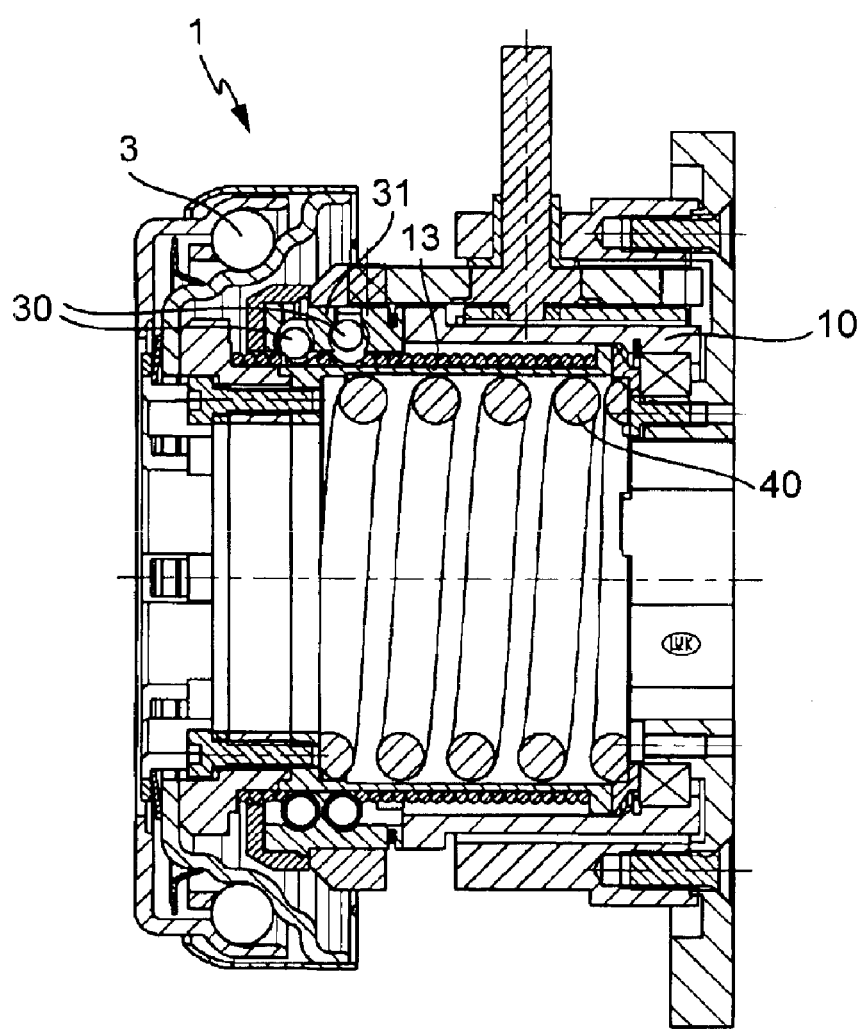
FIG. 7 shows the structure of FIG. 6 but with the follower in a different position.
Figure 8:
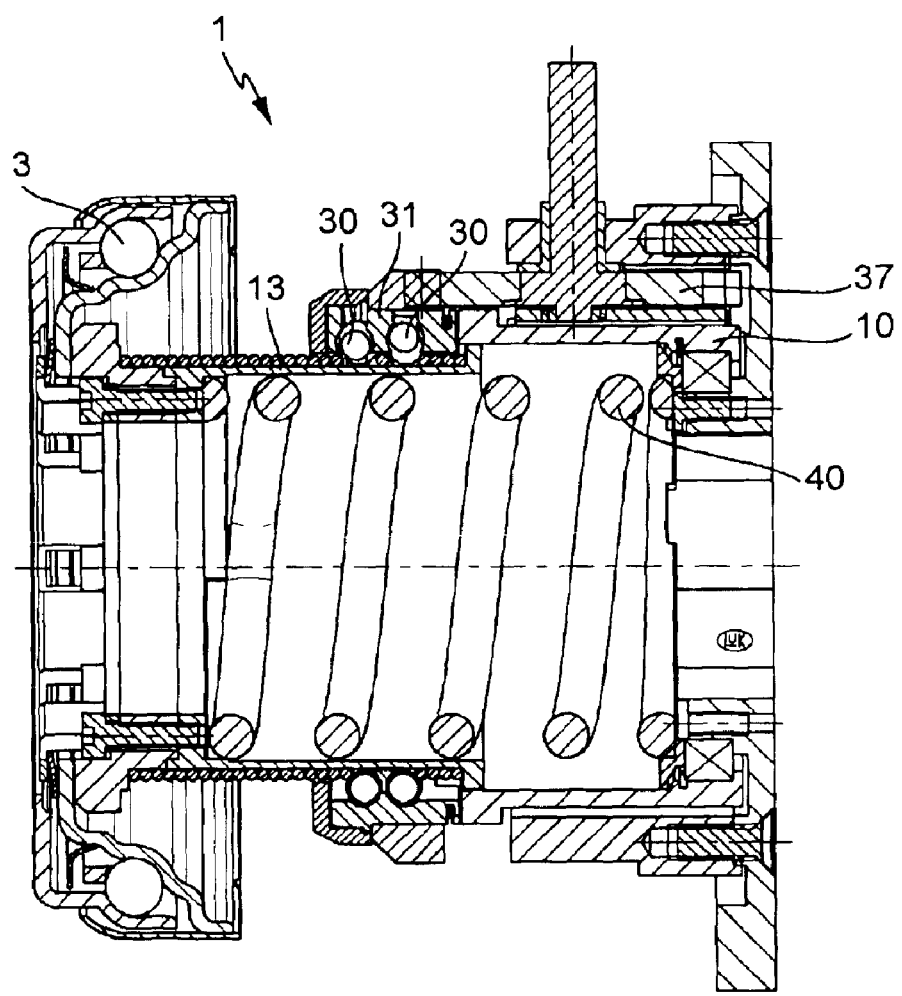
FIG. 8 illustrates the apparatus of FIGS. 6 and 7 but with the follower in an intermediate position.

In FIG. 7, the apparatus 1 of FIG. 6 is shown in fully engaged condition, and FIG. 8 illustrates this apparatus in a partly engaged condition, e.g., in a median position. A coil spring 40 is provided in the apparatus 1 of FIGS. 6 to 8 to serve as a means for prestressing the entire axial drive in such a way that an externally applied compressive stress ensures the application of an at least substantially uniform load upon the helix 8 in the direction of pull as well as in the direction of push. In addition, the prestressing spring 40 serves to take up torque which is being generated by the helix 8 during adjustment of the apparatus 1. Consequently, it is advisable to select a prestressing spring 40 which offers a pronounced resistance to turning. This spring replaces the tongue-and-groove arrangement which serves to ensure accurate axial guidance.

It will be seen that, in the apparatus 1 of FIGS. 6 to 8, the rolling elements 30 are located externally of the helix 8 as seen in the latter's radial direction.

Figure 9:
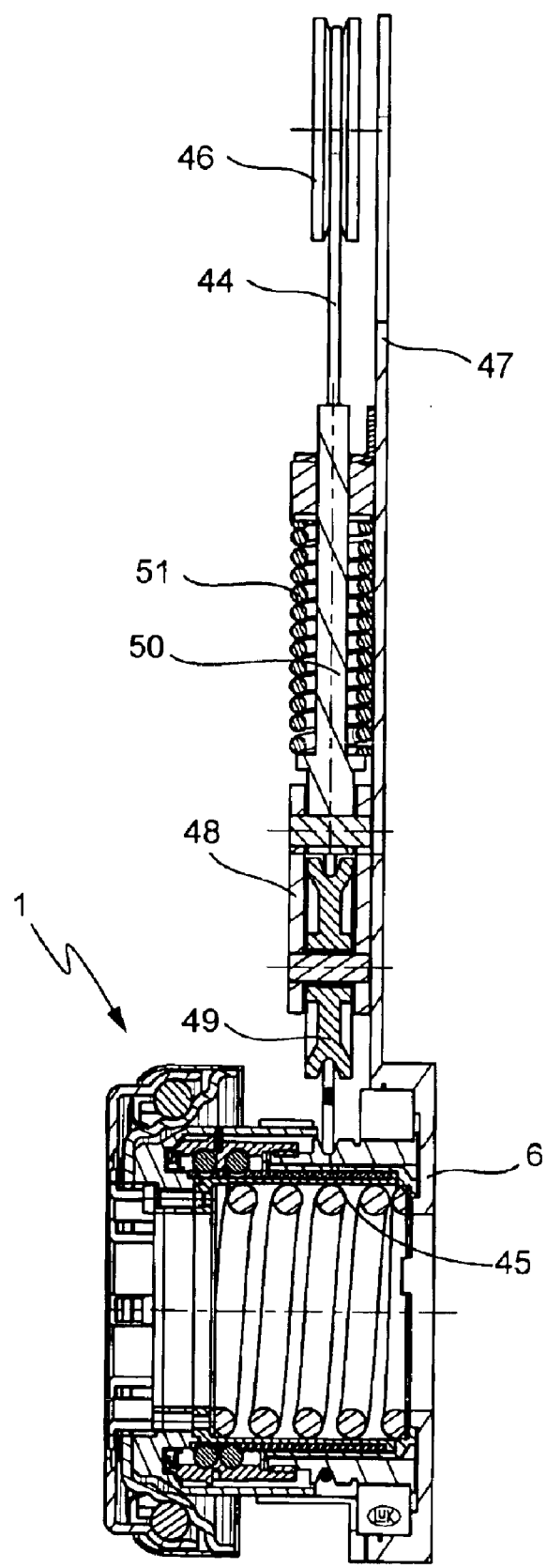
FIG. 9 is a fragmentary perspective view of an apparatus of the type shown in FIG. 5 or FIGS. 6 to 8 and of an external motor for certain of its mobile parts.

FIG. 9 illustrates an external cable drive or bowden drive for an apparatus (axial drive) 1 of the type shown in FIGS. 6 to 8. In such embodiments of the present invention, the external or outer housing parts are turned relative to the non-rotatable inner or internal housing parts; therefore, such movements can be achieved by resorting to a well running wrap-around driving arrangement. FIG. 9 shows an arrangement which can be utilized in lieu of of such wrap-arround arrangements.

A stationary part 6 shown in the lower portion of FIG. 9 is affixed (e.g., threadedly connected) to a transmission case or to a clutch housing (not shown). An endless flexible element 44 (hereinafter called cable for short) is trained around the apparatus 1 which latter is provided with an external groove 45 for the respective portion of the cable. The cable is further trained over a wheel 46, such as a roller or pulley, which is rotatably mounted at that end of an elongated arm 47 which is remote from the axial drive 1.

A cable tensioning device 48 is installed in or on the arm 47 to act upon the cable 44 between the groove 45 and the wheel 46. This tensioning device comprises a further pulley or wheel or roller 49 shiftably mounted on an elongated guide rod 50 and biased by a coil spring 51 which pushes the wheel 49 toward the apparatus 1, i.e., away from the wheel 46. The tensioning device 48 serves to deflect the adjacent portion of the endless cable 44 between the wheel 46 and the apparatus 1 and to thus maintain the cable under requisite tensional stress. The wheel 46 can be rotated by a suitable prime mover, e.g., by an electric, hydraulic, pneumatic or other motor (not shown).

Figure 10:
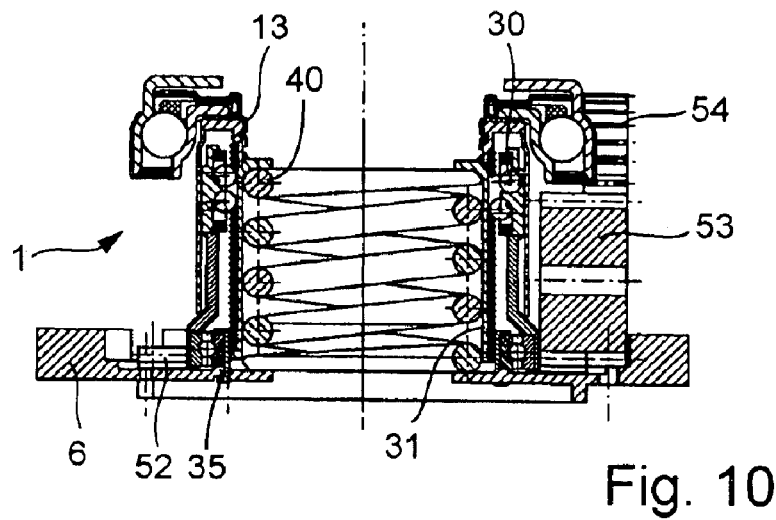
FIG. 10 is a fragmentary axial sectional view of an apparatus with a system of gears which drive its mobile parts.

Referring to FIG. 10, there is shown a further embodiment of the improved apparatus (axial drive) 1. The cage 31 for the rolling elements 30 can be rotated by an arrangement of gears 52, 53 and 54. The gear 52 is provided at that side of the sleeve 10 which faces the stationary part 6. The gear 53 mates with the gear 52 and is mounted on a shaft (not shown) which is journalled in the housing. The gear 52 is rotated (and thus rotates the cage 31) in response to rotation of the gear 53, and the latter is rotatable by the gear 54. The antifriction roller bearing 35 for the cage 31 is mounted on the stationary part 6, and the sleeve 10 for the follower 7 (rolling elements 30) surrounds the bearing 35. The helix 8, the rolling elements 30 and the cage 31 are installed and operate in a manner as already described with reference to FIGS. 6 to 8. The prestressing spring 40 serves to oppose rotation of the casing 13.

Figure 11:
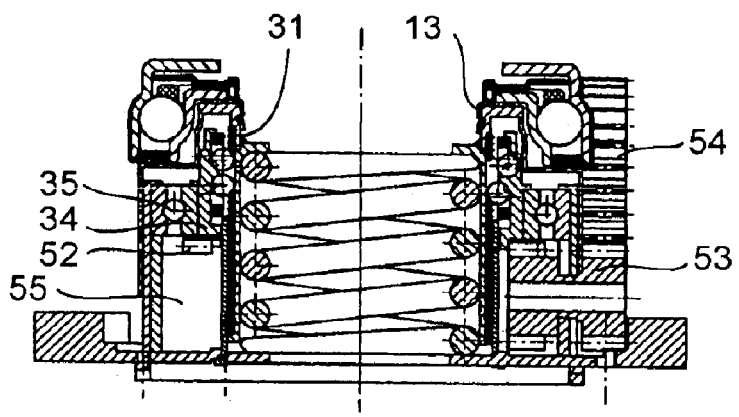
FIG. 11 is a similar view of a first modification of the apparatus which is shown in FIG. 10.

FIG. 11 illustrates an axial drive or apparatus which constitutes a first modification of that shown in FIG. 10. The difference is that the antifriction bearing 35 for the cage 31 is mounted externally of the sleeve 10 which latter carries the gear 52. This gear receives motion from the gear 53 which mates with and thus receves motion from the gear 54, the same as already described with reference to FIG. 10. A distancing sleeve 55 serves to maintain the bearing 35 (and hence the cage 31) in a fixed axial position.

Figure 12:
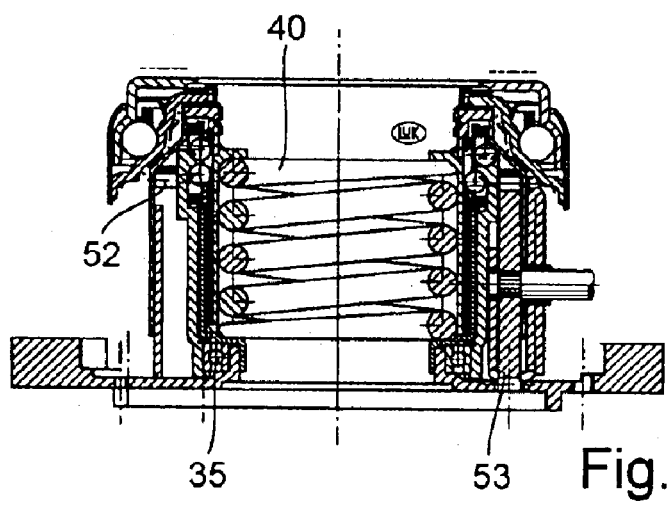
FIG. 12 is a similar view of a second modification of the apparatus shown in FIG. 10.

FIG. 12 shows a second modification of the arrangement of FIG. 10. The bearing 35 of FIG. 12 is mounted substantially in the same way as in FIG. 10; however, its diameter is smaller so that it serves as an abutment for one end convolution of the prestressing coil spring 40.

Figure 13:
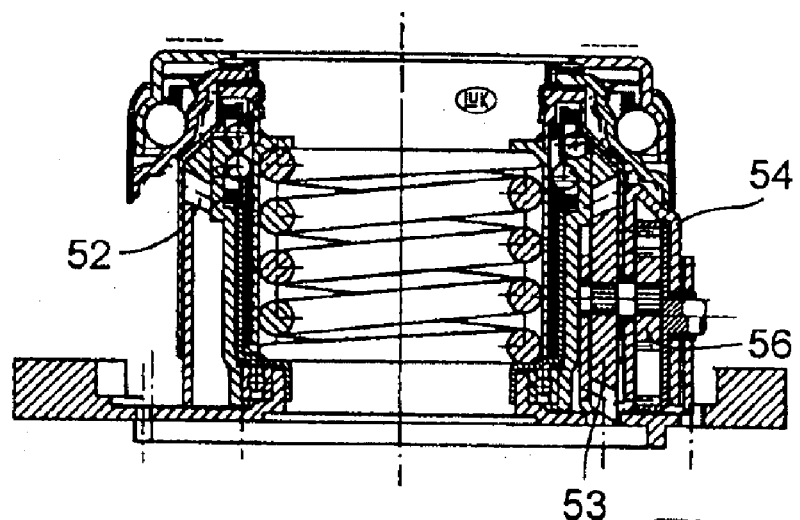
FIG. 13 is a similar view of a third modification of the apparatus shown in FIG. 10.
Figure 14:
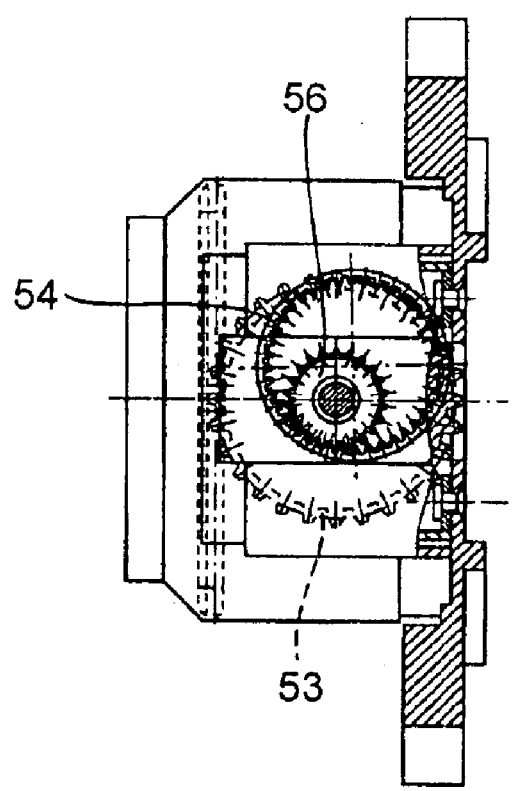
FIG. 14 is a different view of the apparatus which is shown in FIG. 13.

Referring to FIGS. 13 and 14, there is shown an apparatus constituting a modification of that which is illustrated in FIG. 12. The difference is that the drive of FIGS. 13 and 14 employs a bevel gear 52a which replaces the gear 52 of FIG. 12 and mates with the gear 53. A further gear 56 has a relatively small diameter (i.e., much smaller than that of the gear 53) and is non-rotatably connected with the gear 53. The gear 54 is an internal gear and its axis is spaced apart from and is parallel to the common axis of the gears 53, 56. This ensures that one obtains a two-stage (i.e., multistage) gearing which occupies a surprisingly small amount of space.

Figure 15:
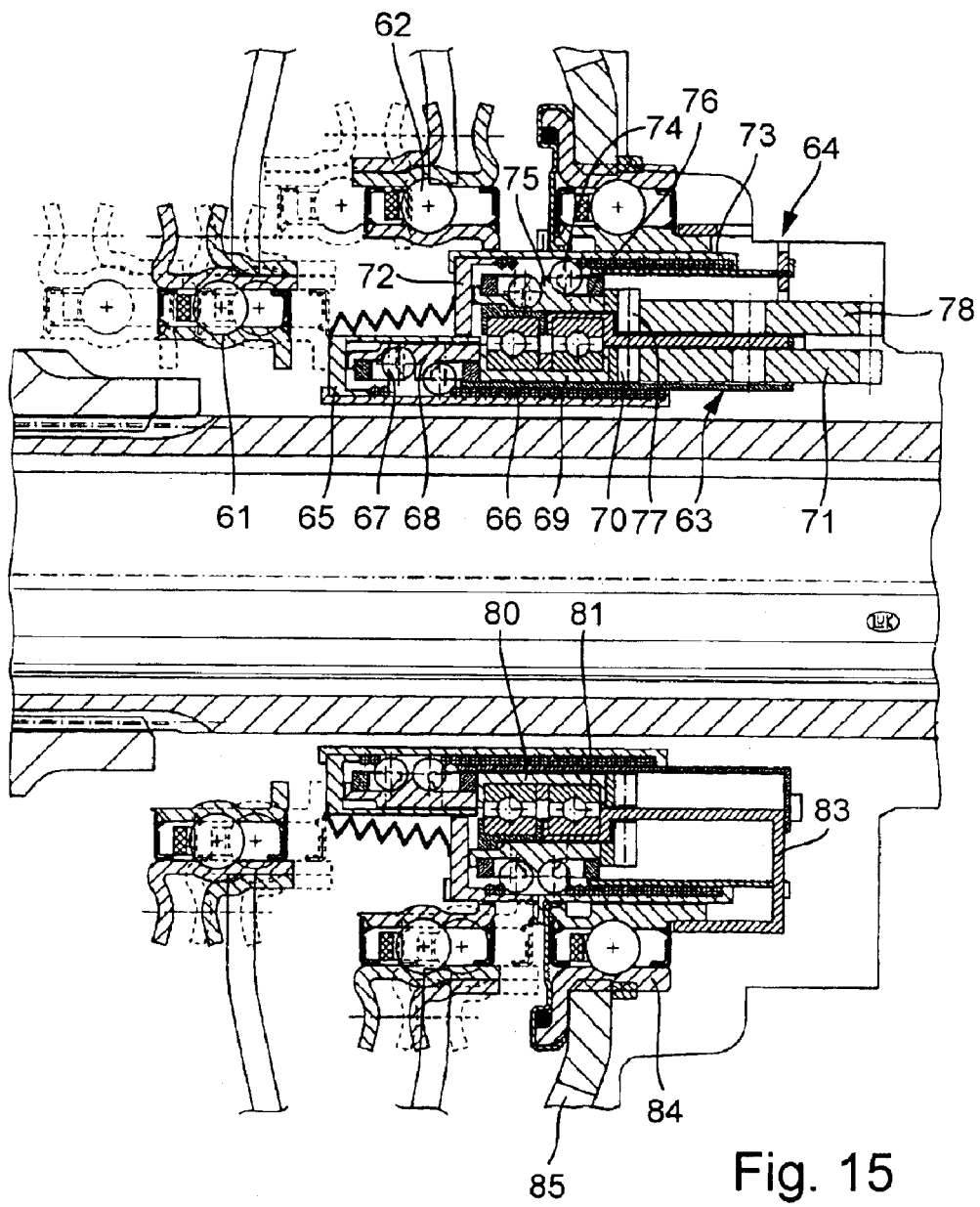
FIG. 15 is a fragmentary axial sectional view of two clutches and of discrete actuating apparatus therefor.

FIG. 15 illustrates certain details of a dual clutch with a dual axial drive, i.e., with a discrete apparatus for each of the clutches. The dual clutch comprises a first clutch actuatable by a first release bearing 61, and a second clutch actuatable by a second release bearing 62. A first apparatus 63 is provided to act upon the release bearing 61, and a second apparatus 64 is employed to move the release bearing 62 for the second clutch. The apparatus 63, 64 are or can be at least substantially coaxial with each other. The first apparatus 63 comprises a first mobile housing 65 which is movable axially by a first coil spring (helix) 66 which, in turn, is movable axially by a first follower including a set of rolling elements 67. The rolling elements 67 are confined in a rotary cage 68 which is connected to a first bearing sleeve 69 provided with a gear 70 at that side which faces away from the first release bearing 61. The bearing sleeve 69 is movable (rotatable about its axis) by a gear 71 which mates with the gear 70; such rotation of the bearing sleeve 69 causes the helix 66 to move the housing 65 axially.

The second apparatus 64 is operatively connected with the second release bearing 62, and its design can match that of the first apparatus 63. This apparatus 64 comprises a second mobile housing 72, a second helix (coil spring) 73, a second set of rolling elements 74, a (second) cage 75 for the rolling elements 74, a bearing sleeve 76 and a gear 77 mating with a gear 78. As can be seen in the lower part of FIG. 15, the first cage 68 as well as the second cage 75 can be rotated relative to ball bearings 80, 81 but are held against axial movement. To this end, the cages 68, 75 are connected with a holder 83 which, in turn, is connected with a retaining collar 85 by way of an additional ball bearing 84.

The first mobile housing 65 can be caused to move axially in response to rotation of the first adjusting gear 71 to thus actuate the first clutch by way of the release bearing 61. The second housing 72 can be shifted in response to rotation of the gear 78 to operate the second clutch by way of the release bearing 62. For example, the gears 71 and 78 can be arranged to rotate about a common axis; to this end, the structure of FIG. 15 can employ two coaxial shafts one of which is confined in the other and each of which is connected with one of the gears 71 and 78. In the embodiment of FIG. 15, a hollow shaft drives the gear 78 and the gear 71 is driven by a shaft which is confined in the hollow shaft.

Figure 16:
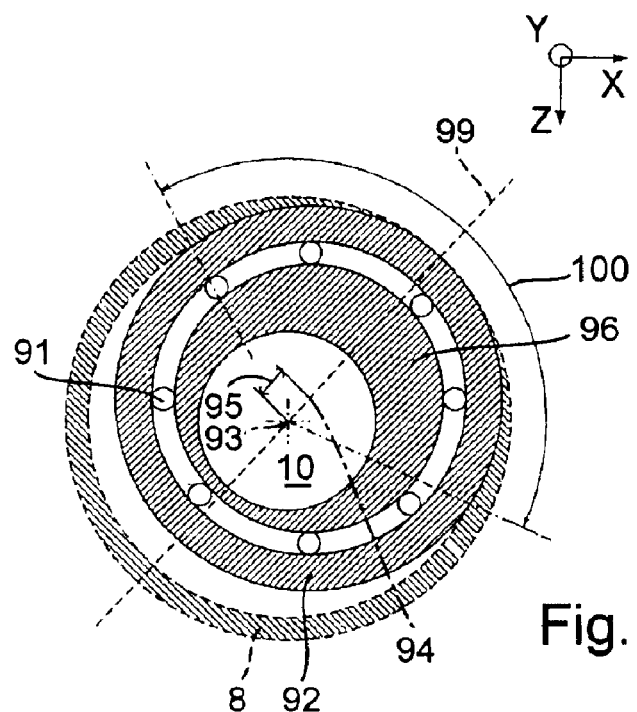
FIG. 16 is a schematic plan view of a portion of an apparatus which employs an eccentric follower.

FIG. 16 is a schematic sectional view of a further apparatus which embodies the present invention. A sleeve 10 serves to carry a follower of the apparatus as well as a rotor forming part of an electric motor corresponding, for example, to that including the stator 12 of FIG. 1. The stator of the electric motor including the combined sleeve and rotor 10 is not shown in FIG. 16. Such stator is provided with a customary winding. The sleeve 10 of FIG. 16 further serves as a guide for the output shaft (not shown) of a transmission cooperating with the clutch that is actuatable by the apparatus including the structure shown in FIG. 16. It will be noted that the dimensions of the parts depicted in FIG. 16 are not drawn to scale; this is done for the purpose of clarifying the illustration of those parts which are shown in FIG. 16.

The sleeve 10 is rotatable about an axis 93 and carries an eccentric follower having an inner member or disc 90 which is provided with a cylindrical external surface. The center of such external surface is shown at 94 (see also FIG. 17). The distance 95 between the axis 93 and the center 94 is indicative of the radial offset (eccentricity) of the external surface of the inner disc 90. This external surface is surrounded by a ball bearing 91 which, in turn, is surrounded by the outer member or disc 92 of the eccentric. The parts 90, 91, 92 together constitute a follower corresponding to the member 7 in the apparatus 1 of FIGS. 1 to 3. The main or primary part of this follower is the outer disc 92. The latter has an at least substantially constant width 96 (refer again to FIG. 17) and is freely rotatable relative to the inner disc 90. The symmetry axis 98 of the follower including the parts 90, 91 and 92 is inclined relative to the axis 94 through an acute angle γ. When the sleeve 10 is caused to rotate, the follower 90, 91, 92 is caused to wobble such that the axis 98 of the follower moves along the peripheral surface of a twin cone or dual cone having at its tip an apex angle equal to 2γ. It is to be borne in mind that the angle γ which is shown in FIG. 17 is much larger than in the apparatus which embodies the structure of FIGS. 16 and 17.

Figure 17:
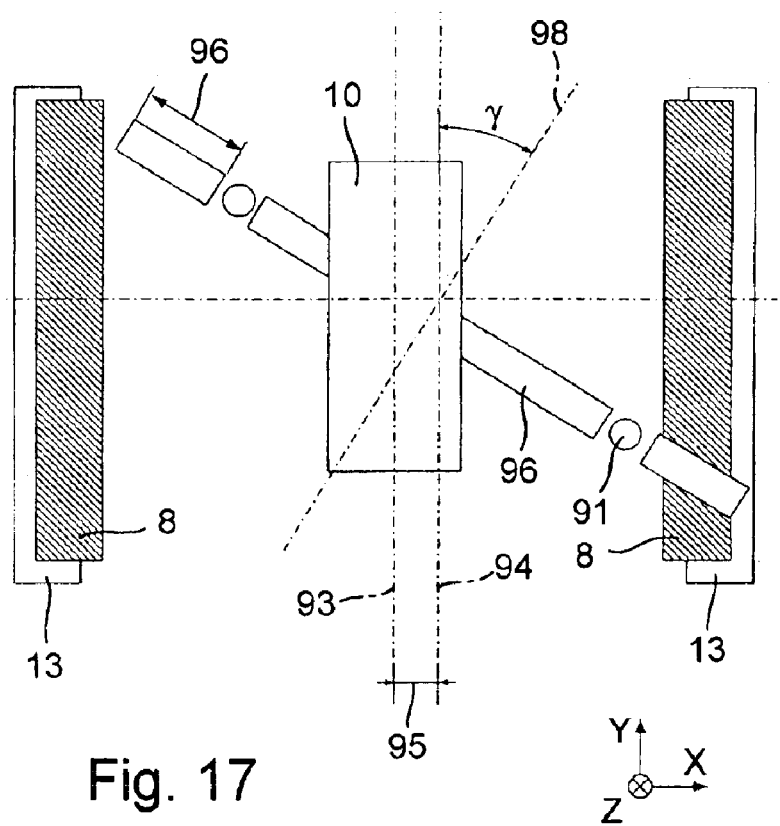
FIG. 17 is an enlarged sectional view of the apparatus which embodies the structure of FIG. 16.

The eccentric mounting and the wobbling movements of the outer disc 92 of the composite follower 90–92 bring about a movement of the outer disc 92 about a connecting line 99 which, as can be seen in FIG. 16, extends through the axis 93 (of rotation of the sleeve 10) and the central point of the eccentric disc 90; this, in turn, forces the follower to penetrate intermittently into the package of convolutions of the helix 8 (see the right-hand portion of FIG. 17). The region of overlap between the outer disc 92 of the follower 90–92 and the individual convolutions of the helix 8 is only a portion of an endless circular path and is indicated in FIG. 16 by the reference character 100.

When the sleeve 10 is set in rotary motion, the outer disc 92 is held against rotation due to engagement with the helix 8 and therefore performs an essentially translatory movement in the X-Z plane (see FIG. 16). Due to the presence of the angle γ between the axes 98 and 94, the outer disc 92 is compelled or induced to carry out a back-and-forth movement in the plane X-Y (see FIG. 16). Such movements of the outer disc 92 cause the region 100 of overlap (i.e., the region in which the follower 90–92 is forced to penetrate into the helix 8) to propagate itself in the direction of rotation of the sleeve 10 and at the angular speed of the latter, i.e., the outer disc 92 engages and penetrates into different portions of the package of convolutions forming part of the helix (coil spring) 8.

The aforedescribed movements of the outer disc 92 of the eccentric follower 90–92 shown in FIGS. 16 and 17 can be more readily comprehended if one attempts to disregard the function of the ball or roller bearing 91, i.e., if one assumes that the outer disc 92 is fixedly secured to the inner disc 90. Under such circumstances, the movement of the region 100 of overlap between the outer disc 92 and the helix 8 would correspond to that of the aforedescribed follower 7, i.e., here again, the outer disc 92 would be caused to move along discrete convolutions of the helix 8. In order to prevent such sliding movement of the outer disc 92 along the convolutions of the helix 8 which is shown in FIG. 17, the apparatus embodying the structure of FIGS. 16 and 17 employs the antifriction bearing 91 which allows the inner disc 90 and the outer disc 92 to turn relative to each other. Consequently, a sliding movement of one and the same portion of the outer disc 92 along the package of convolutions of the helix 8 is now replaced with an essentially mere radial movement of the outer disc 92 into the aforesaid package of convolutions. Thus, the outer disc 92 is forced to move radially of the helix and to penetrate between the latter's convolutions or to be extracted from the helix, again by moving radially of the latter but in the opposite direction. The loci of penetration and extraction of the outer disc 92 vary continuously.

An advantage of the apparatus which embodies the structure of FIGS. 16 and 17 is that, owing to the ability of the outer disc 92 to rotate relative to the inner disc 90 (and owing to the provision of the anti-friction bearing 91), it is now merely necessary to overcome the friction resistance which develops during pushing of the outer disc 92 into and during its extraction from the package of convolutions which constitute the helix 8. Thus, it is no longer necessary to employ a follower which must rotate relative to the helix and/or vice versa when the follower and the helix must be moved relative to each other. It is now possible to operate the combination of the follower and helix with the application of a much smaller torque, e.g., to turn the helix and hence the (outer disc 92 of the) follower 90–92.

The helix 8 of FIG. 17 is installed in a casing 13. The convolutions of this helix can have a circular or other than circular (such as oval, square or other polygonal) outline.

The axis of symmetry 98 of the follower discs 90, 92 and hence also of the antifriction bearing 91 can be warped or winding relative to the axis 93 of the apparatus which embodies such follower. Thus, the axis 98 can be inclined relative to the axis 93 through the angle γ in such a way that these axes do not intersect each other, i.e., they cross each other in space. This enables the outer disc 92 to move along a helical path (not unlike that defined by the thread of a screw) when the sleeve 10 is set in rotary motion.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of apparatus for actuating clutches and the like and, therefore, such adaptations should and are intended to be comprehended within the meaning and range of equivalence of the appended claims.

What is claimed is:

1. Apparatus for effecting a relative movement between first and second parts which are rotatable relative to each other between a plurality of positions, comprising:

a helix having a plurality of neighboring convolutions and being non-rotatably associated with said first part;

a follower affixed to said second part and arranged to extend between at least two of said neighboring convolutions;

means for rotating at least one of said parts relative to the other of said parts to thus effect a movement of said convolutions and said follower relative to each other;

a further part movable axially with and relative to said first part; and coupling means arranged to separably connect said further part to said first part except in at least one position of said second part relative to said first part.

2. The apparatus of claim 1, wherein said second part is movable axially relative to said first part and said coupling means is operative to connect said further part to said first part during a first stage and to permit disconnection of said further part from said first part during a second stage of axial movement of said second part relative to said first part.

3. The apparatus of claim 2, wherein said coupling means includes a springy clamp which is movable at least substantially radially of said second part.

4. The apparatus of claim 3, wherein said clamp is pivotable relative to said second part.

5. The apparatus of claim 1, wherein said further part includes a projection which is engaged by said coupling means when said further part is connected to said first part.

6. The apparatus of claim 1, wherein said coupling means includes a springy clamp having an offset portion.

7. The apparatus of claim 1, wherein said second part is movable axially relative to said first part and said coupling means comprises a springy clamp which is movable at least substantially radially of said second part, and further comprising an abutment positioned to prevent radial movements of said clamp except in said at least one position of said second part relative to said first part.

8. The apparatus of claim 7, wherein said abutment is arranged to mintain said clamp in a position in which said further part is connected to said first part except in said at least one position of said second part relative to said first part.

9. The apparatus of claim 8, wherein said abutment is disengaged from said clamp in said at least one position of said second part relative to said first part.

10. The apparatus of claim 7, further comprising at least one pin engaged by said abutment and extending at least substantially circumferentially of said helix.

11. The apparatus of claim 10, wherein said abutment comprises tongues engaging and fixing said at least one pin relative to said abutment.

12. The apparatus of claim 1, wherein said further part includes a release bearing for a clutch.

* * * * *

UNITED STATES PATENT AND TRADEMARK OFFICE
CERTIFICATE OF CORRECTION

PATENT NO. : 6,886,675 B2
DATED : May 3, 2005
INVENTOR(S) : Christoph Raber

It is certified that error appears in the above-identified patent and that said Letters Patent is hereby corrected as shown below:

Title page,
Item [73], Assignee, delete "Luk Lamellen und Kupplungsbau Beteiligungs KG, Buhl, (DE)" and substitute -- LuK Lamellen und Kupplungsbau Beteiligungs KG, Buhl, (DE) --.

Signed and Sealed this

Twelfth Day of July, 2005

JON W. DUDAS
*Director of the United States Patent and Trademark Office*